June 15, 1965 YOSHIKAZU KUZE 3,188,810
HYDROSTATIC TRANSMISSION
Filed Sept. 4, 1962 6 Sheets-Sheet 1

INVENTOR
Yoshikazu Kuze
BY
ATTORNEYS

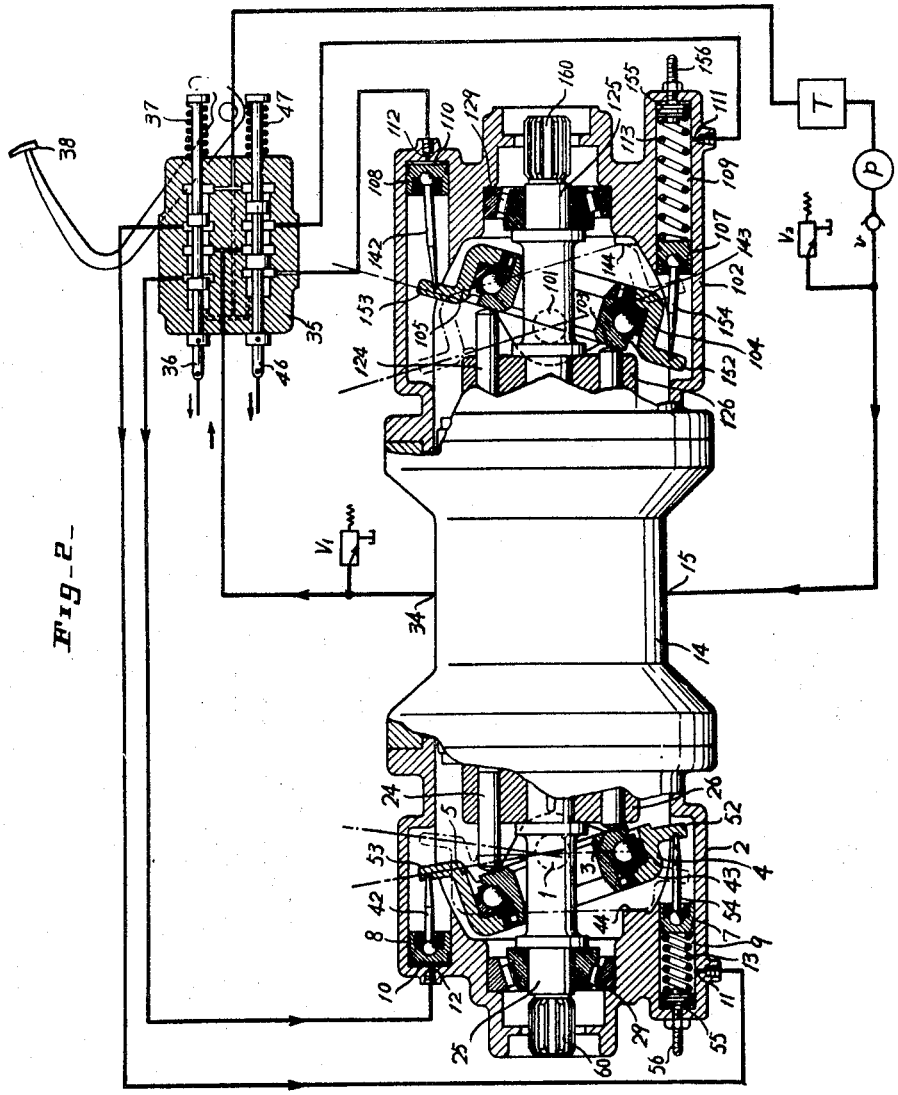
Fig_2_

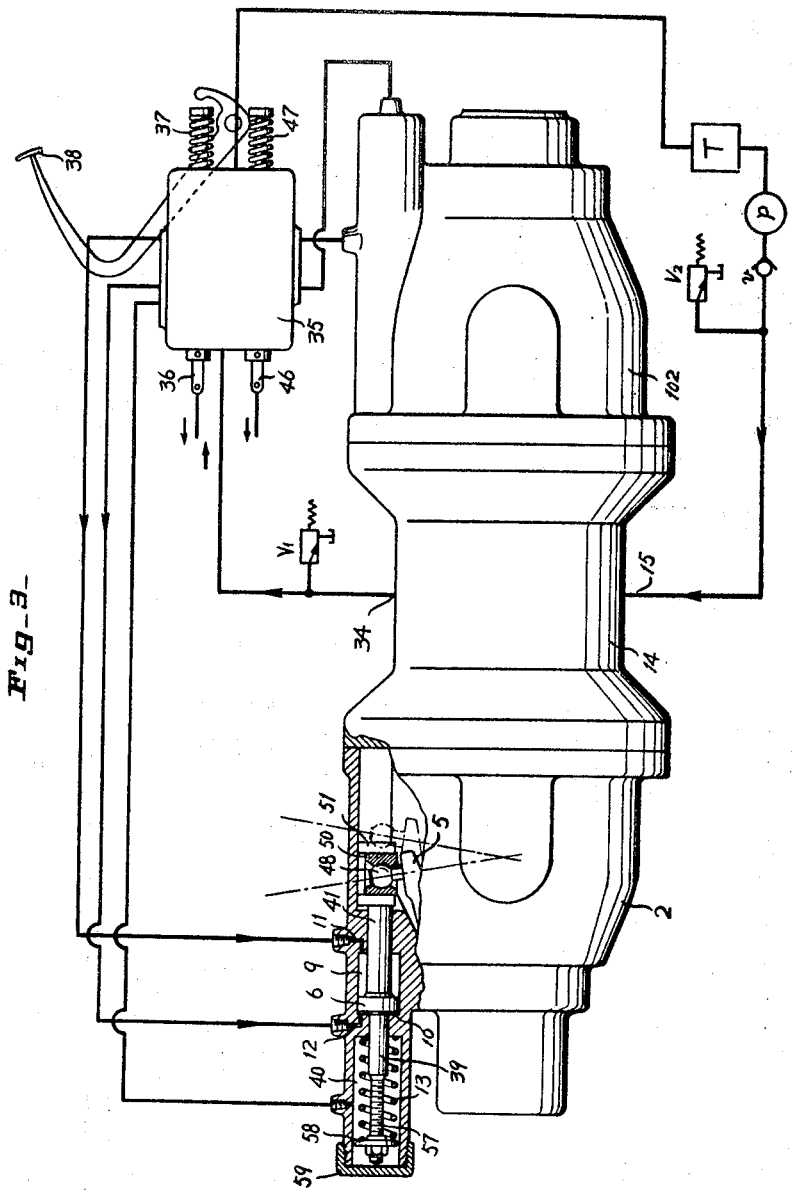

June 15, 1965  YOSHIKAZU KUZE  3,188,810
HYDROSTATIC TRANSMISSION
Filed Sept. 4, 1962  6 Sheets-Sheet 4
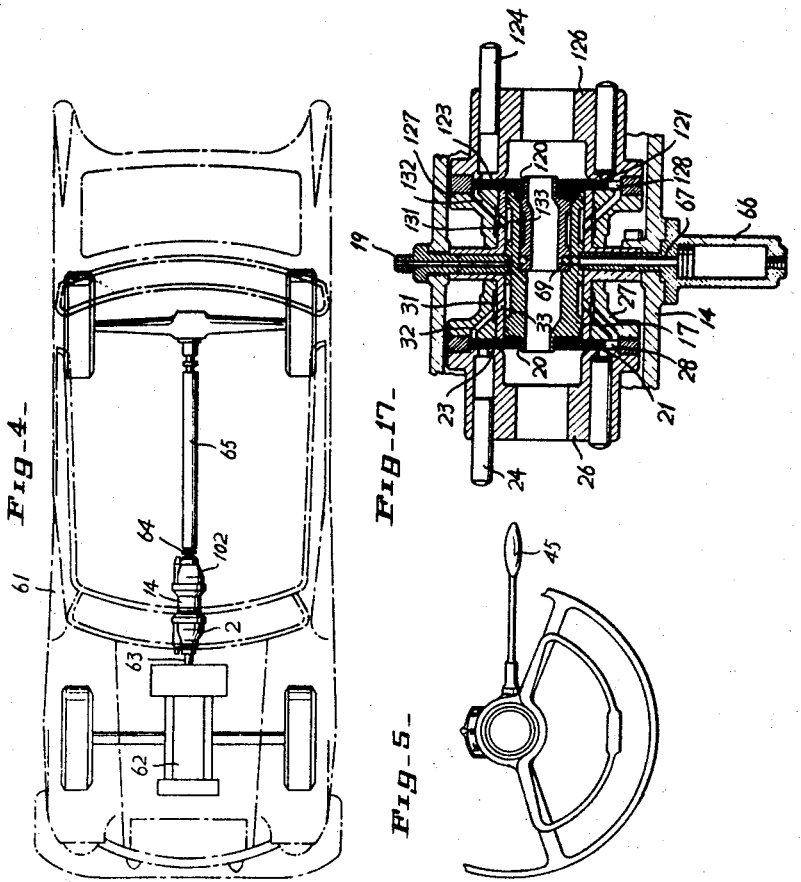
INVENTOR
Yoshikazu Kuze
BY Stevens, Davis, Miller & Mosher
ATTORNEYS

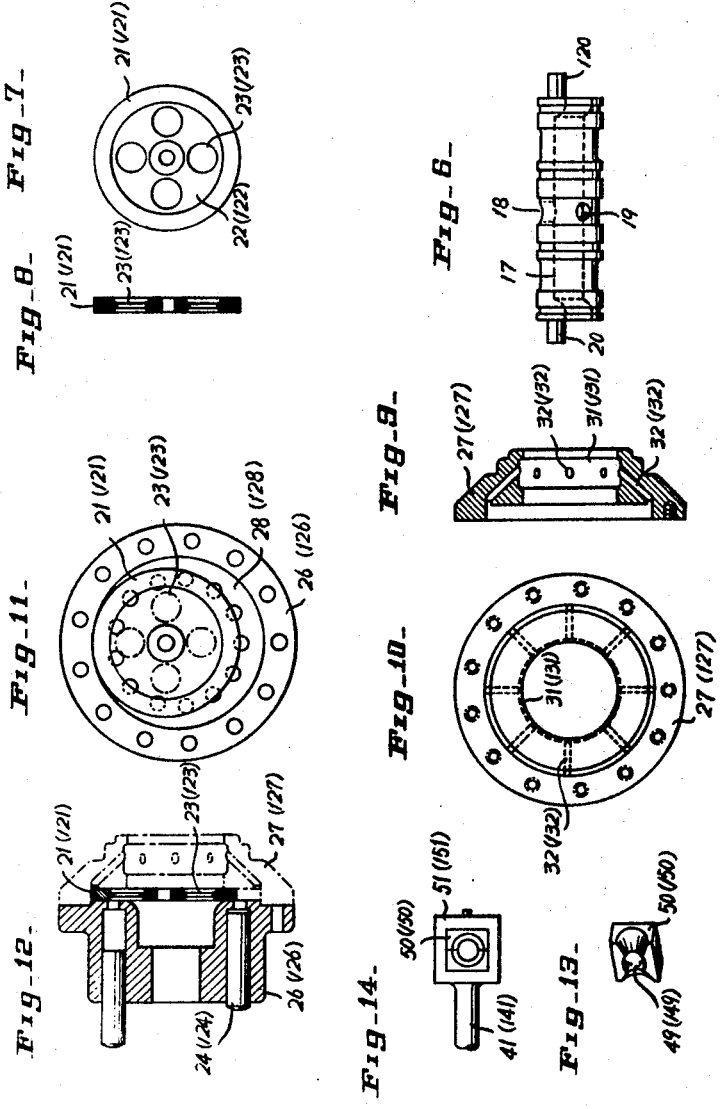

United States Patent Office 3,188,810
Patented June 15, 1965

3,188,810
HYDROSTATIC TRANSMISSION
Yoshikazu Kuze, 64 Chidori-cho, Chofu,
Ota-ku, Tokyo, Japan
Filed Sept. 4, 1962, Ser. No. 221,036
Claims priority, application Japan, Sept. 16, 1961,
36/33,653
17 Claims. (Cl. 60—53)

This invention relates to improvements in hydrostatic transmission for effecting continuous speed change operation in response to the change of the load for the automobile, hoisting machine, steering machine etc.

An object of the invention is to provide a hydrostatic transmission that requires no clutch and brake mechanisms for effecting continuous speed change operation in response to the change of the load and is small in size and light in weight.

For a better understanding of the invention reference is taken to the accompanying drawings, in which, FIG. 1 is a longitudinal sectional view of a hydrostatic transmission embodying the invention and an operating valve thereof and also shows a piping system interconnecting between said gear and valve;

FIGS. 2 and 3 show other embodiments of the hydrostatic transmission according to the invention, the parts different from those shown in FIG. 1 being shown in partly longitudinal sections;

FIG. 4 is a plan view showing one example in which the hydrostatic transmission is applied to an automobile;

FIG. 5 is a partial plan view of a lever and a handle for use in the automobile for bringing the hydrostatic transmission into a forward rotating condition, a neutral condition and a reverse rotating condition through the operating valve shown in FIGS. 1 to 3;

FIGS. 6 to 14 show parts of the hydrostatic transmission according to the invention, in which, FIG. 6 is a front elevation of an oil supply manifold having a hole extended therethrough for communication between the suction side of the pump and the exhaust side of the motor;

FIG. 7 is a front elevation of a valve plate having a center hole adapted to receive an eccentric shaft projecting from each end surface of the oil supply manifold;

FIG. 8 is the longitudinal sectional view of the valve plate;

FIG. 9 is a longitudinal sectional view of an oil distributor block which forms an air gap slidably enclosing said valve plate;

FIG. 10 is the front elevation of the oil distributor block;

FIG. 11 is a front elevation of a plunger housing block arranged opposite to the oil distributor block and of the valve plate inserted between said two blocks;

FIG. 12 is the longitudinal sectional view of the plunger housing block and shows the oil distributor block in chain lines;

FIG. 13 is a perspective view showing one piece of divided block pieces for supporting a plug projecting from the free end of a swash plate fitted around a plunger control ring;

FIG. 14 is a side view of an inner end of a piston rod slidably enclosing therein said two divided block pieces;

FIG. 17 is a sectional view of an oil supply manifold for another embodiment of the gear according to the invention.

Figure 1:
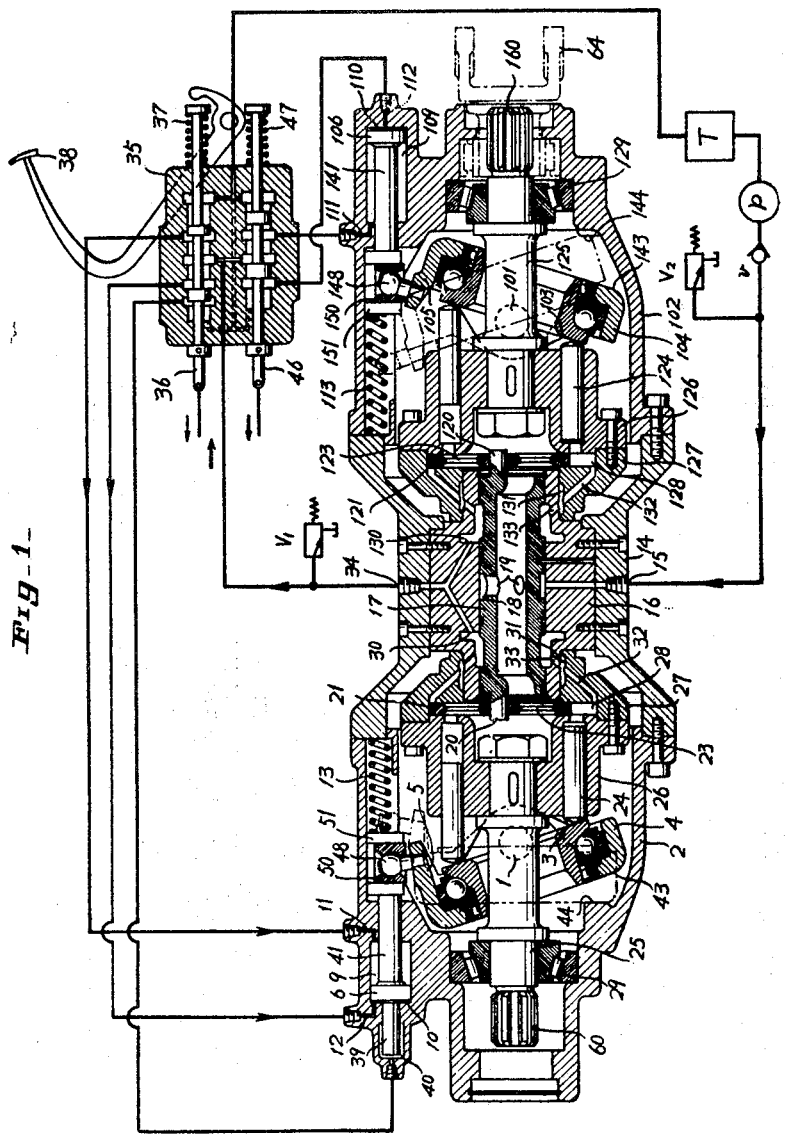

A hydrostatic transmission shown in the drawings comprises a variable delivery oil pump provided with a swash plate 4 rotatably pivoted with various inclinations in a pump casing 2 by means of diametrically arranged pins 1, 1 and loosely fitted around the outer periphery of a plunger control ring 3, the free end 5 or ends 5, 5 of said swash plate 4 being operatively connected to a differential piston 6 (FIG. 1) or pistons 7, 8, (FIG. 2) and two chambers 9, 10 formed at each side of the piston being communicated through holes 11, 12 with a discharge side of the pump, having a spring 13 adapted to aid the side of said differential piston 6 or pistons 7, 8 having a smaller pressure receiving area, and an oil motor provided with a swash plate 104 rotatably pivoted with various inclinations in a motor casing 102 by means of diametrically arranged pins 101, 101 and loosely fitted around the outer periphery of a plunger control ring 103, the free end of the swash plate being operatively connected to a control piston 106 (FIG. 1) or pistons 107, 108 (FIG. 2) for determining forward and reverse rotations, and said variable delivery oil pump and oil motor being arranged each side of any symmetrically to the centerline of a common casing 14 and integrally connected through the common casing such that the oil passages belonging to said pump and motor are communicated each other in the common casing 14.

The oil in an oil tank T is supplied through a feed pump $p$, a check valve $v$, an oil inlet hole 15 formed in said common casing 14, and oil hole in an outer connection pipe or sleeve 16, an annular groove 18 formed around an oil supply manifold 17, and holes 19 communicated with the groove 18 to the oil supply manifold 17. The sleeve 16 and manifold 17 together comprise an oil distribution assembly or unit. The oil passes through several holes 23 formed in a disc 22 (shown in FIGURE 7) secured to the inside of the valve plate 21 rotatably mounted around a shaft 20 projected from one end of the oil supply manifold 17 to the plunger 24 communicating with said holes 23 (the plunger 24 shown at the upper side of FIG. 1). The oil supply manifold 17 is secured in the common casing 14 in alignment with the axis of a rotating shaft 25 for driving the plunger housing block 26.

The shaft 20 is secured to the end of the oil supply manifold 17 at a position eccentric to the axis thereof, so that the open end of the plunger 24 is brought into communication with a space formed outside the rim of the valve plate 21 in accordance with the rotation of the plunger housing block 26 as shown in the lower side of FIG. 1. That is, the oil is pushed into a crescent shaped space 28 formed between the outer periphery of the valve plate 21 and the inner periphery of the oil distributor block 27. The oil distributor block 27 is secured to the plunger housing block 26 so as to be rotated together with the latter.

The outer connection pipe 16 constitutes a bearing arranged in axial alignment to a bearing for supporting the driving shaft 25. The outer connection pipe 16 having an outlet side oil passage 30 therein is secured in the common casing 14 and said oil distributor block 27 is rotatably supported by a smaller diameter portion of the outer connection pipe 16. The inner peripheral surface of the oil distributor block 27 supported by the smaller diameter portion of the outer connection pipe 16 is formed with a wide annular groove 31. The oil in said crescent space 28 enters through radially arranged holes 32 formed in the oil distributor block 27 into the annular groove 31. The oil filled in the annular groove 31 serves to lubricate the contact surfaces of the smaller diameter portion of the outer connection pipe 16 and of the oil distributor block 27 and forms a thin high pressure oil film between said two members, constituting an effective high pressure hydraulic bearing which can withstand a heavy load and high speed rotation without making direct contact between said two members. This high pressure oil enters through radial holes formed in the outer connection pipe 16 into said exhaust side oil passage 30 formed also in the pipe 16 and communicated with the oil motor side and then supplied to the oil motor, thereby driving the latter.

As will hereinafter be described, the pressure oil enters through radial holes 133 formed in the smaller diameter portion at the motor side of the outer connection pipe 16 into a wide annular groove 131 formed in the inner peripheral surface of an oil distributor block 127 rotatably supported by the smaller diameter portion of said outer connection pipe 16. The oil in the annular groove 131 serves to lubricate the contact surfaces of said two members and constitutes an effective high pressure hydraulic bearing which can withstand a high load and high speed rotation, which could not be attained by a metal bearing, in a manner similar to that used on the above mentioned pump side.

This high pressure oil enters through radial holes 132 formed in the oil distributor block 127 into a crescent shaped space 128 formed between the inner peripheral surface of the oil distributor block 127 and the outer peripheral surface of the valve plate 121. Thus, the plunger 124 having the inner open end communicated with said crescent shaped space 128 (the plunger 124 at the lower side of FIG. 1) is pushed outwards by said pressure oil, thereby rotating the plunger housing block 126 and the oil motor shaft 125 secured thereto in accordance with the inclination of the plunger control ring 103 which is in contact with the outer end of the plunger 124.

As the plunger housing block 126 rotates, the plunger 124 when arrived at the upper side of FIG. 1 is pushed into the block 126 by means of the plunger control ring 103 which is in contact with the outer end of the plunger 124, thereby pushing out the oil which has finished its work by the outer end of the plunger 124 into the disc 122 (FIG. 7) of the valve plate 121. The oil, then, returns through the holes 123 formed in the disc 122 into the oil supply manifold 17 and fed back through the opposite end thereof to the pump side.

Similarly, to the pump side as above mentioned, in the motor side the valve plate 121 serves to effect a valve action, that is, the outer and inner sides of the valve plate 121 bring the oil passage into communication with the exhaust and suction sides, respectively. The valve plate 121 is also fitted about the eccentric shaft 120 formed at the inner end of the oil supply manifold 17.

Moreover, the smaller diameter portion of the outer connection pipe 16 for supporting the inner surface of the oil distributor block 127 constitutes a bearing corresponding to a bearing 129 for supporting a motor shaft 125 and arranged in opposite to the latter bearing. The pressure oil is also fed through an outlet hole 34 formed in the common casing 14 and communicated with said exhaust oil passage 30 into two chambers 9, 10 of a cylinder of the above mentioned differential piston 6 or pistons 7, 8.

Included in this piping system is an operating valve 35 as shown in FIGS. 1 to 3. FIGS. 1 to 3 show an operating condition of the operating valve 35 wherein the hydrostatic transmission according to the invention is forwardly rotated. If a valve rod 36 is moved to the left as shown by the arrow against the action of a spring 37 by means of a pedal 38, the oil pressure at the discharge side is supplied to a chamber 10 formed at one side of the differential piston 6 and having a larger pressure receiving area and to a chamber 40 enclosing a piston rod 39 formed at the same side as the chamber 10 and having a smaller diameter, whilst a chamber 9 opposite the differential piston 6 and having a smaller pressure receiving area or a chamber 9 having a smaller pressure receiving area of a piston 7 having a smaller diameter of differential pistons 7, 8 is communicated with the oil tank T.

Thus, the piston 6 or the pistons 7 and 8 no more acts or act as the differential piston, and there results an inward movement of a piston rod 41 having a larger diameter of the piston or a piston rod 42 of the piston 8. Thus, the swash plate 4 is caused to be rotated until a shoulder 43 of the swash plate 4 comes into engagement with a projection 44 formed in the inside wall of the pump casing 2 making the inclined angle of the plunger control ring 3 zero, thereby rapidly stopping the feed of oil to the motor side. In this case, the pump side is made driven, whilst the motor is not rotated in its neutral condition or the motor side under rotation is braked.

The above mentioned neutral condition is maintained by rotating a lever 45 shown in FIG. 5 to a neutral position N and moving the above mentioned valve rod 36 which connected with lever 45 to the left. If the lever 45 is moved back to a forward rotating position $D_r$ or the pedal 38 is released, the motor becomes again driven and rotated in a forward direction.

Subsequently, if the lever 45 is rotated from the neutral position N to a reverse rotating position R, the above mentioned valve rod 36 moves back to the right by the restoring action of the spring 37, which makes it possible to move another valve rod 46 to the left as shown by an arrow against the action of a spring 47. Then, the oil pressure at the exhaust side is supplied through the operating valve 35 to a piston 106 for determining the forward and the reverse rotation of the motor to rotate a swash plate 104 with a free end 105 engaged with a piston rod 141. Therefore, a plunger control ring 103 loosely fitted in the swash plate 104 is caused to be rotated from an inclined position shown by the full line in FIG. 1 to an inversely inclined position shown by the chain line where a shoulder 143 formed at the end opposite the free end of the swash plate 104 makes engagement with a projection 144 formed at the inside wall of the motor casing 102.

Consequently, the plunger control ring 103 controls the plungers 124 such that the plunger housing block 126 is caused to be rotated in a reverse direction, thereby reversely rotating the motor shaft 125. Provision is made of a high pressure relief valve $V_1$ and a low pressure relief valve $V_2$ in the piping system between the oil exhaust hole 34 and the operating valve 35 and in the piping system between the oil suction hole 15 and the check valve $v$, respectively, in order to automatically feed back the oil upon occurrence of an abnormal pressure condition.

The plunger control ring 3 at the pump side is rotatably supported through a roller bearing and a thrust ball bearing in the swash plate 4 and the driving shaft 25 for rotating the plunger housing block 26 is loosely extended through the swash plate 4 such that the swash plate 4 can rotate with inclination around the diametrically arranged pins 1, 1.

The differential piston 6 is operatively connected to the free end 5 of the swash plate 4 through a sphere shaped plug 48 projected from the free end 5 and embraced between two divided block pieces 50, 50. These block pieces 50, 50 are slidably fitted in a frame shaped end 51 of the piston rod 41 having a larger diameter of the differential piston 6 and extending through the cylinder, which renders it possible to rotate the plunger control ring 3 in inclined condition.

The differential pistons 7, 8 are engaged with the free ends 5, 5 of the swash plate 4 through lugs 52, 53 engaged with tapered ends of a piston rod 54 of the piston 7 having a small diameter and of a piston rod 42 of the piston 8 having a large diameter, as shown in FIG. 2.

In the embodiment shown in FIG. 2, a spring 13 for aiding the piston 7 having the smaller diameter and the smaller pressure receiving area is made adjustable in its strength by means of a threaded rod 56 of an oil ring piston 55 threadedly engaged with the pump casing 2. In the case of the differential piston 6 such as shown in FIG. 1, it may be possible to provide a threaded rod 57 at the end of the piston rod 39 having the smaller diameter and a washer 58 adjustably engaged with the threaded rod 57 as shown in FIG. 3. The rear end of the chamber 40 is closed by an end cover 59. The plunger control ring 103 at the motor side is rotatably supported in the swash plate 104 by means of a roller bearing and a thrust ball bearing. The center shaft is secured to the plunger housing block 126, that is the motor shaft 125 is loosely extended through the swash plate 104 such that the swash plate 104 can rotate with inclination around the diametrically arranged pins 101, 101.

The piston 106 for determining the forward and reverse rotations is operatively connected to the free end 105 of the swash plate 104 through a sphere shaped plug 148 projected from the free end of the swash plate 104 and embraced between two divided pieces 150, 150. The divided pieces 150, 150 are enclosed in a frame shaping end 151 of the rod 141 of the piston 106 for determining the forward and reverse rotations such that the plunger control ring 103 can be rotated with inclinations. Two chambers 109, 110 formed in the cylinder of the piston 106 for determining the forward and reverse rotations are communicated through dashpot holes 111, 112 and the operating valve 35 with the oil passage 30 at the exhaust side of the pump.

Provision is made of a spring 113 arranged at the back of the frame shaped end of the piston rod 141 and adapted to push back the piston 106. In the embodiment shown in FIG. 2, provision is made of a piston 107 for effecting the forward rotation and a piston 108 for effecting the reverse rotation, independently, and each tapered end of the piston rods 154, 142 is engaged with each indentation formed in each lug 152, 153 projected from each free end of the swash plate 104 as shown in the drawing. The chamber 110 formed at one side of the piston 108 for effecting the reverse rotation is communicated through a dashpot hole 112 with the operating valve 35, whilst the chamber 109 formed at one side of the piston 107 for effecting the forward rotation is communicated through a dashpot hole 111 with the operating valve 35. A spring 113 enclosed in the chamber 109 engages with an oil ring piston 155 having a threaded rod 156. The rod 156 can be rotated from the outside so as to adjust the strength of the spring 113.

In FIG. 2, 60 and 160 designate a splined shaft end of the pump shaft 25 and of the motor shaft 125, respectively. When the hydrostatic transmission according to the invention is applied to a chassis of an automobile, the splined shaft end 60 at the pump side is directly connected to the output shaft 63 of an engine 62 as shown in FIG. 4, whilst the splined shaft end 160 at the motor side is conected through a universal coupling 64 to a transmission shaft 65 for rear wheels. In the above mentioned hydrostatic transmission, if the variable delivery oil pump is driven by the engine 62 etc., the reverse pressure produced at the oil motor due to the load such as the wheels of the automobile becomes increased, which results in an increase of the exhaust oil pressure at the pump side. This oil pressure is supplied through the dashpot holes 11, 12 to the two chambers 9, 10 having different pressure receiving areas, so that the piston 6 or the pistons 7, 8 is or are operated by the difference of the pressures applied to each end thereof, thereby rotating the plunger control ring 3 in the swash plate 4 against the action of the spring 13 so as to decrease the inclined angle. Thus, the amount of the exhausted oil becomes automatically reduced in response to the increase of the reverse pressure of the load to decrease a number of rotations of the motor side. Thus, the no-stage speed changing action can automatically and continuously be effected in response to the change of the load without requiring any clutch. The reason why the above mentioned differential piston mechanism is adopted is that with the conventional piston it is required to use a very strong spring in order to push back the piston, which results in a massive structure of the part at the pump side, whilst in the differential piston according to the invention it is only necessary to use a spring 13 which is sufficient to oppose a force produced by multiplication of the difference of both pressure receiving areas of the piston times a given maximum exhaust pressure, which with the aid of a high speed driving operation makes it possible to improve the speed change gear as a whole small in size and light in weight.

Moreover, the pump side and the motor side are secured symmetrically to the common casing 14 for communicating the oil passages of these two sides to each other, so that the above mentioned speed change action can positively be effected and the size of the gear as a whole becomes smaller. If the inclined angle of the plunger control ring 3 is made zero by the operation of the above-mentioned differential piston, the discharge of pumping oil should be zero, the flow of oil at the motor side during its rotation can be regulated to brake the motor. Even if the motor is stopped, the braking effect is maintained, which renders it possible to save a brake mechanism.

Moreover, the output shaft is rotatable if the plunger control ring 103 is reversely inclined beyond right angles to the output shaft, that is, its neural position. The speed change gear according to the invention has detailed constructional features in that in order to effect the high speed operation under the high pressure the valve plate 21, 121 for dividing the oil passages is in a balanced condition with the high pressure oil, which permits of effecting the high speed rotations of the plunger housing block 26, 126 and of the oil distributor block 27, 127, and that the oil distributor block 27, 127 is effectively supported under a floated condition through a high pressure thin oil film filled in the wide annular groove 31, 131 formed around the small diameter portion of the outer connection pipe 16.

Figures 15, 16:
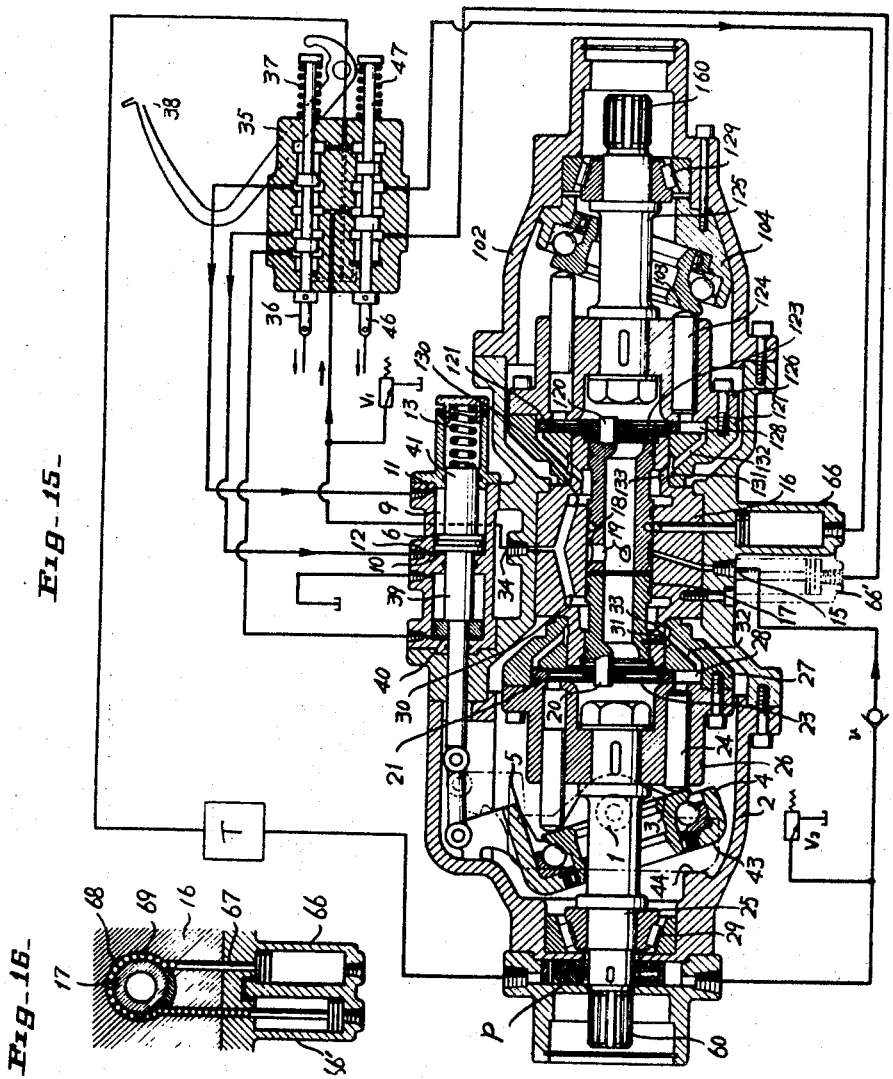
FIG. 15 is a longitudinal sectional view showing a further embodiment of the gear according to the invention.
FIG. 16 is a longitudinal sectional view showing a rotary driving mechanism for an oil supply manifold.

FIG. 15 shows another embodiment of the gear according to the invention wherein provision is made of an oil supply manifold for the oil pump and of an oil supply manifold for the oil motor, separately. In this case, the oil supply manifold for the oil motor only is caused to be rotated.

In this embodiment, if a lever 45 is rotated from a neutral position N to a reverse position R, the above mentioned valve rod 36 returns to the right by the action of the spring 37. Another valve rod 46 moves against the action of the spring 47 to the left as shown by arrows. Thus, the oil pressure is applied to the oil pressure cylinder 66', which results in a thrust upon a piston rod thereof. Consequently, the group of balls 69 filled in a groove 68 formed in the oil supply manifold 17 are pushed to cause a 180° rotation of the latter in the outer connection pipe 16, so that a relative position between the valve plate 121 and the group of plungers 124 is reversed, thereby rotating the oil motor in a reverse direction.

In the above mentioned embodiment, the group of balls 69 and two oil pressure cylinders 66, 66' are used to displace the rotating center axis of the valve plate, which renders it possible to reverse the direction of rotation of the oil motor in a simple and easy manner without requiring any complex reversing mechanism.

FIG. 17 shows a further embodiment of the gear shown in FIG. 15 wherein the oil supply manifold for the oil motor is loosely fitted in the inner surface of the oil supply manifold for the oil pump. In this embodiment, the oil supply manifold for the oil motor is caused to be rotated within the low pressure oil passage, so that it may be possible to perform the operation of the oil motor in a smooth manner.

As above mentioned, the invention provides a hydrostatic transmission which can automatically and positively effect a no-stage and continuous speed change operation in response to the change of the load without requiring any clutch and brake and can also reverse the driven side, and which is efficiently operable in a high speed under a high pressure, and small in size and light in weight. The speed change gear according to the invenion may be applied to a wide range of fields such, for example, as various kinds of automobiles, a hoisting machine and a steering machine etc.

Various other modifications may be made without departing from the spirit of the invention.

What I claim is:

1. A hydrostatic transmission comprising a central casing having opposed open ends, a variable delivery oil pump mounted on one of said ends and an oil motor mounted on the other of said ends, said oil pump and motor each comprising a casing fixedly attached to respective ones of said ends, a sleeve fixedly mounted within said central casing, an oil supply manifold fixedly mounted within said sleeve, said pump and said motor each comprising a rotary shaft and a plunger housing fixedly mounted on each of said shafts, said housings having opposite radial faces, and plunger bores in said housings opening through both said opposite radial faces, a plunger in each of said bores, said plungers being slidable in said bores and extending outwardly of one of said radial faces in said housings in a direction away from said central casing, an oil distributor block fixedly attached to each of said plunger housings, said distributor blocks being rotatively journalled on opposite axial ends of said sleeve, a valve plate mounted between each of said plunger housings and said distributor blocks and being rotatable relative thereto, said valve plate comprising a solid peripheral rim and through axial apertures radially inward of said rim, said rim being eccentrically disposed relative to said plunger bores whereby said rim is radially outward of some of said bores and radially inward of others of said bores, a tilt assembly located axially outwardly of each of said plunger housings and mounted for pivotal movement about respective axes which are perpendicular to the rotative axes of said shafts, said assemblies each comprising a radial surface abutting the ends of each of said plungers, adjustment means to vary the inclination of said radial surfaces, said adjustment means comprising a fluid pressure cylinder having a bore and a piston slidably mounted therein, said piston having opposite radial faces, one of said faces having a larger radial area than the other, fluid passageways leading into each end of said cylinder bore, said piston being connected to said tilt assembly, axial movement of said piston causing said tilt assembly to pivot about its pivot axis, a resilient means urging said piston towards the end of said bore which faces said larger area face of said piston, a first oil conduit leading from exteriorly of said central casing to one radial face of each of said valve plates, said valve plate apertures connecting said oil conduit only to certain ones of said plunger bores in each of said plunger housings, a second oil conduit leading from exteriorly of said central casing only to others of said plunger bores in each of said plunger housings.

2. The transmission of claim 1, said first conduit leading from the discharge side of a second oil pump and said second conduit leading to a valve control device, said cylinder bore fluid passageways being connected by conduit means to said valve control device, said control device being connected by conduit means to the inlet side of said oil pump.

3. The transmission of claim 1, said oil supply manifold comprising a pivot pin at each end thereof, said valve plates being rotatably mounted on respective ones of said pins.

4. The transmission of claim 1, each of said shafts being rotatably supported near one end thereof by a rotary bearing mounted in said oil pump and oil motor casings, respectively, and being rotatably supported at their other ends by virtue of said distributor blocks being respectively journalled on opposite ends of said sleeve.

5. The transmission of claim 3, said shafts being coaxial and said pivot pins being along a different axis from said shafts, said valve plates being circular, the central axes of said plunger bores lying on a circle which is eccentric relative to said valve plates.

6. The transmission of claim 1, wherein said valve plates are circular and are rotatably mounted on an axis which is parallel to and eccentric to the rotational axis of said shafts, said shafts being co-axial, each pair of said plunger housing and said distributor block defining a co-axial circular space therebetween, one of said plates being eccentrically mounted within each of said circular spaces with the rim of said plate contacting a portion of the circumferential wall of said circular space, said rim and said circumferential wall defining a crescent-shaped space therebetween.

7. The transmission of claim 1, said oil supply manifold comprising an inner bore extending axially and opening at opposite ends of said manifold, the opposite ends of said inner bore opening into said valve plate apertures, said valve plate apertures opening only into certain ones of said plunger bores, a space between the outer periphery of said valve plate rim and said distributor and plunger blocks, only others of said plunger bores opening into said space, said space being open to said second oil conduit.

8. The transmission of claim 7, wherein said space opens to the journal surfaces at the ends of said sleeve upon which said distributor blocks are journalled.

9. A hydrostatic transmission, comprising a first and a second rotary shaft co-axially mounted within a casing, each shaft being rotatably mounted at an outer end thereof in said casing, each inner end of said shaft rigidly mounting a block assembly thereon, each said assembly comprising a plunger housing and a distributor block rigidly connected together, said assemblies being axially spaced from each other, said plunger housing comprising a plurality of plungers slidably mounted in bores which are parallel to said shafts, a tilt assembly mounted on each of said shafts axially outwardly of said plunger housing, said tilt assembly comprising an abutment surface abutting an end of each of said plungers, at least one of said tilt assemblies being pivotable about an axis which perpendicularly intersects the rotational axis of said shaft, an oil distribution unit mounted in said casing between said block assemblies, each of said shafts being rotatably supported at their inner ends by virtue of said block assemblies being rotatably journalled upon said oil distribution unit, a valve plate rotatably supported at each end of said unit about an axis eccentric to the rotary axis of said shafts, a first oil conduit leading from exteriorly of said casing, through said oil distribution unit, and to apertures in said valve plates, said apertures in said plates connecting said first conduit only with certain ones of said bores and said valve plate closing off all other of said bores from said first conduit, said other of said bores opening to a second conduit, said second conduit leading to exteriorly of said casing.

10. The transmission of claim 9, wherein said first and second conduits are simultaneously open to corresponding ones of said bores in both said assemblies.

11. The transmission of claim 9, wherein said tilt assemblies each comprise a swash plate and a plunger control ring, the pivotable tilt assembly comprising a swash plate pivotably mounted perpendicularly to said shaft, said rings being rotatably mounted in said plates, said rings comprising said abutment surfaces, means attached to said pivotable plate for adjusting the pivotal position thereof.

12. The transmission of claim 9, wherein only one of said tilt assemblies is pivotable and the other is in fixed tilt position, said oil distribution unit comprising two co-axial oil manifolds, said valve plates being rotatably mounted at opposite ends of said manifolds and eccentrically to said shafts, one of said manifolds being stationary and the other being rotatable whereby the eccentricity of the valve plate mounted on said rotatable manifold is shifted through rotation of said rotatable manifold.

13. The transmission of claim 12, wherein a flexible means having opposite ends is engaged about the outer circumference of said rotatable manifold, opposite ends of said flexible means being connected to respective pistons which are fitted in respective cylinders, said cylinders comprising oil passages leading from within to without of said cylinders.

14. The transmission of claim 13, wherein said pistons are axially movable within said cylinders to an extent corresponding to a maximum rotation of said rotatable manifold of 180°.

15. The transmission of claim 12, wherein said rotatable manifold is rotatably journalled within said stationary manifold.

16. The transmission of claim 12, wherein said rotatable manifold is the one on which is eccentrically mounted the valve plate corresponding to the tilt assembly which is fixed in its tilt position.

17. The transmission of claim 9, wherein said second conduit comprises oil passages in respective ones of said block assemblies, said passages leading to the bearing areas upon which said block assemblies are rotatably journalled and therefrom to an outlet passage in said oil distribution unit, said outlet passage leading exteriorly of said casing.

References Cited by the Examiner
UNITED STATES PATENTS

| | | | |
|---|---|---|---|
| 1,480,568 | 1/24 | Pilliod | 91—467 X |
| 2,190,812 | 2/40 | Wahlmark | 91—175 |
| 2,254,319 | 9/41 | Rose | 60—53 X |
| 2,283,761 | 5/42 | Richter | 91—467 X |
| 2,370,906 | 3/45 | Koza | 60—53 X |
| 2,395,980 | 3/46 | Wahlmark | 60—53 |
| 2,610,614 | 9/52 | Sedgwick | 60—54.5 X |
| 2,706,384 | 4/55 | Schott | 60—53 |
| 2,857,584 | 10/58 | Gibson | 60—54.6 X |
| 2,907,230 | 10/59 | Kollman | 60—53 X |
| 2,910,008 | 10/59 | Weisenbach | 60—53 X |

JULIUS E. WEST, *Primary Examiner.*

EDGAR W. GEOGHEGAN, *Examiner.*